(No Model.) 2 Sheets—Sheet 1.
L. NOVOTNY.
COMBINED RUNNER AND WHEELED VEHICLE.
No. 393,076. Patented Nov. 20, 1888.
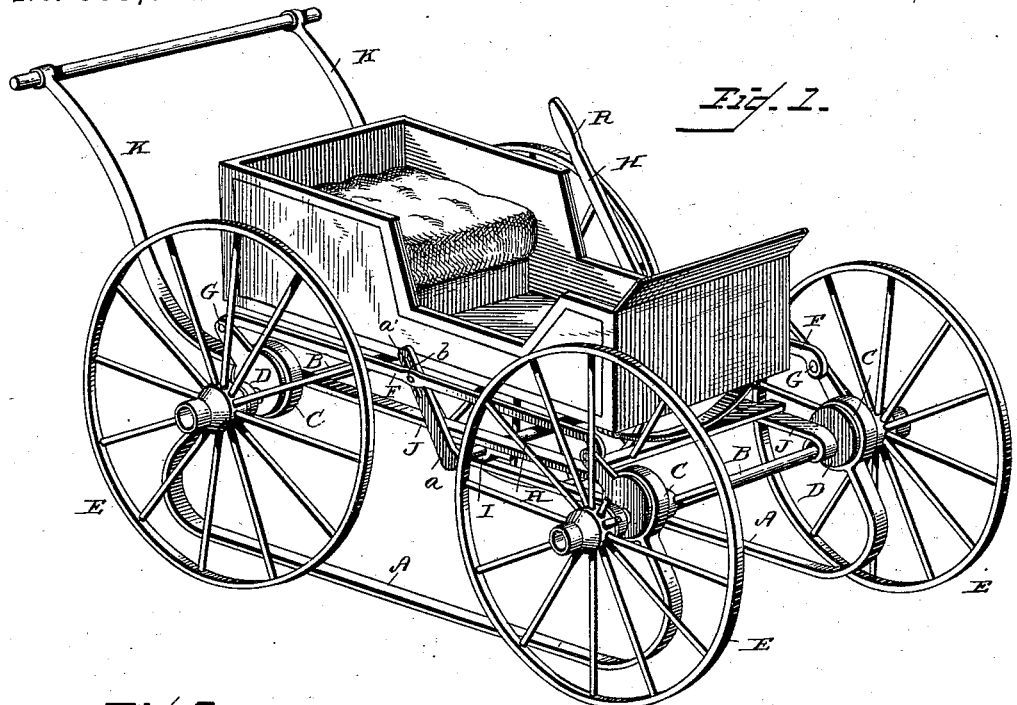
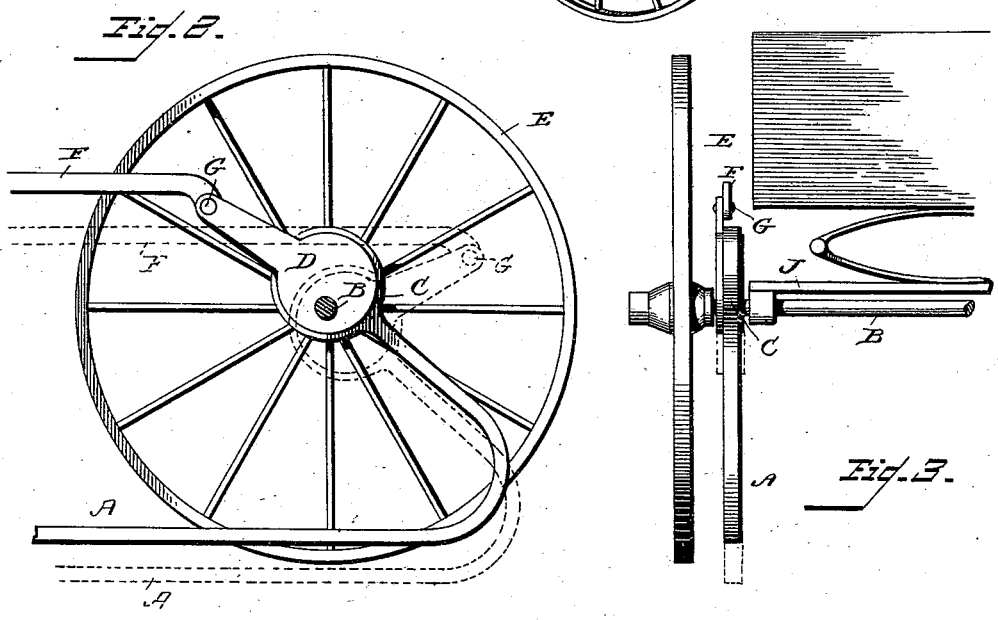
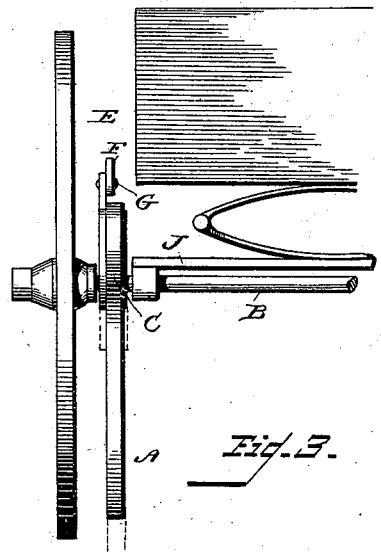
Witnesses
Inventor,
Louis Novotny,
By his Attorney,

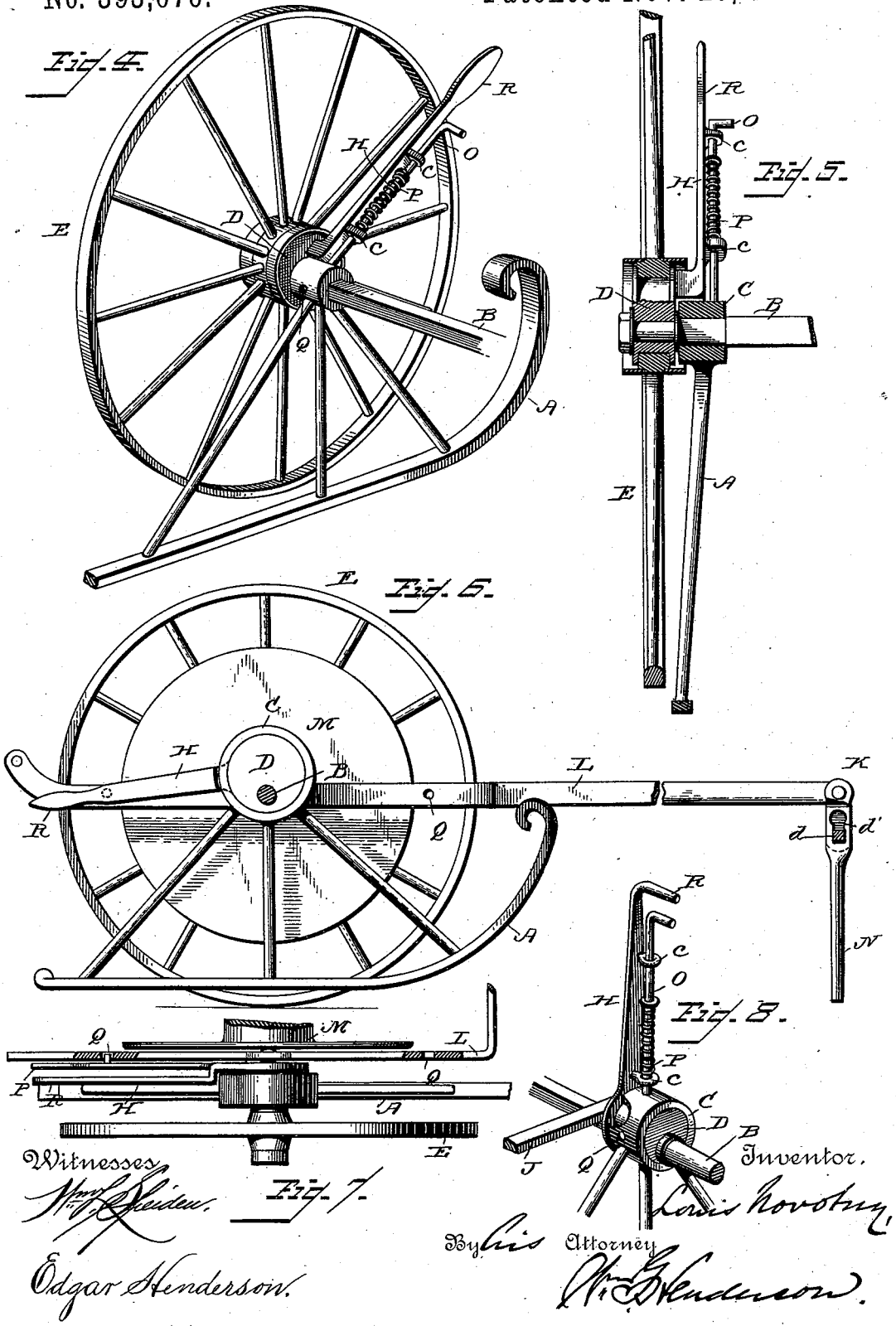

UNITED STATES PATENT OFFICE.

LOUIS NOVOTNY, OF ANTIGO, WISCONSIN.

COMBINED RUNNER AND WHEELED VEHICLE.

SPECIFICATION forming part of Letters Patent No. 393,076, dated November 20, 1888.

Application filed July 13, 1888. Serial No. 279,812. (No model.)

*To all whom it may concern:*

Be it known that I, LOUIS NOVOTNY, a citizen of the United States, residing at Antigo, in the county of Langlade and State of Wisconsin, have invented certain new and useful Improvements in a Combined Runner and Wheeled Vehicle; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to combined wheeled and runner vehicles, and has for its object to construct such a vehicle which can be quickly converted from a wheeled to a runner vehicle, or vice versa, as occasion or necessity may require; and it consists in combining with the runners and wheels an eccentric to raise or lower one or the other of them, as required; and it further consists in the construction and combination of parts hereinafter particularly described, reference being had to the accompanying drawings, forming a part hereof.

Figure 1 is a perspective of a child's carriage with my invention applied to it. Fig. 2 is a side view, with one wheel removed, of a portion of the same, showing the runner raised in full lines and lowered in dotted lines. Fig. 3 is a front view of the same. Fig. 4 is a perspective of one wheel and runner, showing the eccentric to the hub. Fig. 5 is a section through the same. Fig. 6 is a sectional view of a hose cart. Fig. 7 is a plan of same with parts broken away. Fig. 8 is a modification of the spring-fastening.

In the drawings, the letter A designates the runners, connected by the axles B, and having sockets, hubs, or collars C, in which fit the eccentrics D. The ends of the axles which project beyond the sides of the runners have the wheels E, journaled thereon so as to turn. The front eccentrics are suitably connected with the rear eccentrics, say, by pitmen or arms F, jointed at each end by bolts G to the eccentrics, and the two arms are connected to each other by a lever, H, the arms $a$ of the lever being formed with slots through which fulcrum-bolts $b$ pass and enter the pitman or connecting-arms F. The lever may also be provided with any suitable support. For instance, as shown in Fig. 1, plates or clips I may be riveted to the under sides of the reaches J and the horizontal part of the lever rest in them so as to be supported by them.

The reaches J are shown in Fig. 1 extended to form the handles K. Any desired form of body may be provided for the vehicle.

In operation, if it is desired to convert the wheeled vehicle into a runner, the lever H will be thrown in one direction—say, backward—as shown in Fig. 1, which will turn the eccentrics so as to lower the runners and raise the wheels, when the runners will be in use and the wheels out of action. The lever being thrown beyond its center, will be locked in position, so as to hold the wheels and runners to their adjusted positions. When it is desired to use the wheels instead of the runners, the lever will be reversed, so as to lift the runners and lower the wheels, and will be locked in the manner described.

The construction described can be used on large or small vehicles, and its parts may be varied in construction without departing from my invention. For instance, the eccentric, instead of being applied to the sockets or collars formed on the runners, could, as is obvious, be applied to the hubs of the wheels with like effect, as shown in Fig. 4. Again, the shifting-lever can be differently constructed and applied; also, the invention can be applied to a two-wheeled instead of a four-wheeled vehicle.

As illustrative of the last-mentioned modification, I have shown in Fig. 6 a reel-cart with the invention applied to it. In such modification the axle B has a frame, L, journaled on it, and also the spool or reel M, on which the hose is wound. The frame is provided with the handle K, which in this case has the prop N, which is connected to the handle by an angular pin, $d$, passed through an angular slot made in the prop, the slot being larger at its upper than at its lower end, so that when the prop is drawn down the enlarged portion of the slot will be brought around the angular pin and thus permit the prop to be turned up under the handle, as shown, and when it is turned up and pushed until the smaller portion of the slot comes around the angular pin, the pin will support the prop in a horizontal position. The eccentrics D have the levers connected directly to them instead of indirectly, as in Fig. 1, and the levers are locked to their positions by pins or bolts O, connected with the levers, say, through springs P and pressed by the springs into holes Q made in the frame L. When the levers are thrown forward, the runners are lowered, and when thrown backward and locked in place the wheels are in action and the runners raised. The levers H may be provided with handles R.

Instead of the form of lever shown in Fig. 6, I may use the form shown in Fig. 8, which is provided with bolt or pin O, guided in its sliding movement by the eyes c, attached to the lever and adapted in its two extreme positions to shoot into holes Q, formed in this instance in the socket or hub C. Many other forms of levers might be described; but no further illustrations will be given, as the invention is not confined to any one form.

If desired, the reel and frame of the hose-cart can be removed or even the runners or the wheels and a collar be secured to the axle by a set-screw to fill the place of the removed part. A collar and set-screw are so well known and, not being claimed, are not illustrated.

The invention described is not confined to the particular vehicles illustrated, but may be applied to any form or size of vehicle in which it is designed to shift from a runner to a wheeled vehicle, or vice versa, without removing either the runner or wheels from the vehicle.

Having described my invention and set forth its merits, what I claim is—

1. In a combined runner and wheeled vehicle, the combination, with the wheels and the runners, one of which parts is formed with a socket to receive an eccentric, of eccentrics fitting in said sockets to raise or lower one of said parts into a different plane from the other, as and for the purposes set forth.

2. In a combined runner and wheeled vehicle, the combination, with the wheels and runners, one of which is formed with sockets to receive eccentrics, of eccentrics fitting in said sockets and a lever for moving said eccentrics to raise or lower the wheels or runners, substantially as and for the purposes set forth.

3. In a combined runner and wheeled vehicle, the combination, with the wheels and runners, one of which parts is formed with sockets to receive eccentrics, of eccentrics fitting in said sockets, a lever for moving said eccentrics to raise or lower the wheels or runners, and means for locking said lever in its adjusted position, substantially as and for the purposes set forth.

4. The combination, with the front and rear axles, of the wheels and runners mounted thereon, one of which parts is formed with sockets to receive eccentrics, arms connecting the front and rear eccentrics, and a lever for moving said arms to change the eccentrics to raise or lower the wheels or runners, substantially as and for the purposes set forth.

In testimony whereof I affix my signature in presence of two witnesses.

LOUIS NOVOTNY.

Witnesses:
W. H. DAWLEY,
CARRIE A. COLLINS.